US007012825B2

(12) United States Patent
Nielsen

(10) Patent No.: US 7,012,825 B2
(45) Date of Patent: Mar. 14, 2006

(54) COMBINED AC-DC TO DC CONVERTER

(75) Inventor: Henning Roar Nielsen, Brenderup (DK)

(73) Assignee: American Power Conversion Denmark ApS, Kolding (DK)

( * ) Notice: Subject to any disclaimer, the term of this patent is extended or adjusted under 35 U.S.C. 154(b) by 0 days.

(21) Appl. No.: 10/470,124

(22) PCT Filed: Jan. 22, 2002

(86) PCT No.: PCT/DK02/00041

§ 371 (c)(1),
(2), (4) Date: Dec. 23, 2003

(87) PCT Pub. No.: WO02/060032

PCT Pub. Date: Aug. 1, 2002

(65) Prior Publication Data

US 2004/0084967 A1 May 6, 2004

(30) Foreign Application Priority Data

Jan. 26, 2001 (DK) .......................... PA200010 0140

(51) Int. Cl.
*H02M 1/10* (2006.01)
(52) U.S. Cl. ....................... 363/142; 363/86
(58) Field of Classification Search ............ 363/84–86, 363/89, 124, 125, 142; 323/222–225, 282, 323/351
See application file for complete search history.

(56) References Cited

U.S. PATENT DOCUMENTS

| 4,823,247 A | * | 4/1989 | Tamoto ..................... 363/16 |
| 5,654,591 A | * | 8/1997 | Mabboux et al. ............ 307/66 |
| 5,751,564 A |   | 5/1998 | Dien ........................... 363/37 |
| 5,930,122 A | * | 7/1999 | Moriguchi et al. .......... 363/17 |
| 6,549,441 B1 | * | 4/2003 | Aigner et al. ............... 363/142 |

FOREIGN PATENT DOCUMENTS

WO          WO 00/33451          6/2000

* cited by examiner

*Primary Examiner*—Gary L Laxton
(74) *Attorney, Agent, or Firm*—A. Jason Mirabito; Mintz; Levin; Shane H. Hunter

(57) ABSTRACT

The invention relates to a combined AC-DC to DC converter. The converter provides the option of coupling to an AC supply source with at least one phase and the further option of coupling to at least one DC supply source. The converter obtains supply from at least one supply source at a time; and the converter contains controllable contact means that are, upon switching between supply sources, capable of connecting and disconnecting the individual supply sources to/from the converter; whereby a pulse signal is generated. The converter contains at least one coil that is in connection with at least one DC output. The proposed converter distinguishes itself over the prior art in that switching between supply sources is accomplished by means of the contact means over a period of time, where the pulse signal is divided into periods; and wherein the periods alternatingly originate from at least one first supply source and at least one second supply source; and wherein the current pulses from the first supply source is regulated in dependence on the current pulses from the second supply source; and wherein the converter contains means for voltage regulating at least one DC output. Hereby a flexible converter is obtained that can obtain supply from an AC supply source and one or more DC supply sources; and wherein switching between a first supply source and a second supply source can be accomplished without supply failures; and wherein, in overload situations, it is possible to draw on two or more supply sources.

10 Claims, 7 Drawing Sheets

COMBINED AC-DC TO DC CONVERTER

CROSS-REFERENCE TO RELATED APPLICATION

This application is the National Stage of International Application No. PCT/DK02/0004, filed 22 Jan. 2002.

FIELD OF THE INVENTION

The invention relates to a combined AC-DC to DC-converter. The converter provides at least one DC output from at least one AC supply with at least one phase and at least one DC supply. The AC supply supplies an AC signal comprising positive and negative half-periods. The converter comprises at least one coil that is in connection with the DC output. The converter contains controllable contact means adapted for connecting and disconnecting the AC supply and the DC supply to and from the converter.

BACKGROUND

Patent application No. WO 0033451 teaches a converter unit for converting two or more DC voltage levels from the input of the converter unit to a DC voltage on the output of the converter unit, wherein the converter unit comprises controllable switch means that are able to connect and disconnect the individual DC input voltage level for forming an oscillating signal, and wherein the converter unit comprises filtering means for low pass filtering of the oscillating, signal for forming the DC voltage on the output of the converter unit.

The converter unit discussed in WO 0033451, however, presents an inconvenience because it cannot connect to an AC supply source. Additionally, the converter unit is not capable of performing a gradual switch of supply source without supply loss, see the below description of a method. Nor is the converter unit capable of performing an adaptive switch in case of overload situations.

U.S. Pat. No. 5,751,564 discloses a switching power supply system which is able to connect two or more different power sources with different voltage levels, and can provide power even when the primary power source is low or completely absent. The output voltage is more constant than a conventional switching power supply, and the internal loss is also smaller. As a result, the back-up supply time is longer than that of a conventional UPS system. Finally, when used in a notebook computer, for example, there is no need to use an AC to DC adapter when connecting to an AC power supply, it being possible to connect the switching power supply directly to the AC power supply.

The ('564) system, however, is not capable of performing an uninterrupted switching between an AC supply source and a DC supply source.

SUMMARY OF THE INVENTION

It is the object of the invention to provide a converter that can obtain supply from one or more supply sources such as an AC source with one or more phases in combination with one or more DC sources, wherein switching from a first supply source to a second supply source is accomplished gradually without supply failure; and wherein—in overload situations—it is possible to rely on one or more supply sources.

This can be accomplished in that the switching between supply sources is accomplished by connecting and disconnecting the supply sources to/from said converter based on phase information of the AC signal, whereby the supply signal fed to said coil is divided into periods, wherein the periods of the supply signal alternatingly originate from either positive or negative half-periods of the AC signal and current pulses from said DC supply; and wherein the current pulses from the DC supply are regulated in dependence of the AC signal; and wherein the converter contains means for voltage regulating said at least one DC output.

A flexible converter is achieved that can obtain supply from an AC supply source and one or more DC supply sources; and wherein switching from a first supply source to a second supply source can be accomplished without supply loss; and wherein—in overload situations—two or more supply sources can be relied on. In a typical overload situation with an AC source in the form of a current network from a diesel generator and a DC source in the form of a battery, the advantage of this converter is that the current from the AC source can be maintained on a constant highest value in that supplementary energy is supplied from the DC source. It is possible to use smaller cables and fuses in the AC source without such fuses being blown upon overload.

The term 'supply source' is used herein to designate either an AC source with one or more phases connected via a common point of reference, or a DC source or two DC sources that are connected in series via a common point of reference, whereby a positive and a negative supply voltage are obtained.

The converter is characterized in that the AC supply source is a single-phase AC source and that at least one DC source is provided. A converter for single-phase systems is obtained that protects against supply failures in case of abrupt switching between the single-phase AC supply source and one, optionally more, DC sources.

The converter is characterized in that the AC supply source is a polyphase AC source and that at least one DC source is provided. A converter for polyphase systems is obtained that protects against supply failures in case of abrupt switching between the polyphase AC supply source and one, optionally more, DC sources.

The converter is characterized in that, on the basis of a signal from a current detector that measures the current through a coil, a control circuit has means for connecting and disconnecting, respectively, the one terminal of the coil to/from a DC supply source; and means to connect and disconnect, respectively, the second terminal of the coil to/from a common point of reference. The current through the coil flows to the DC output of the converter during periods when the second terminal of the coil is not connected to the common point of reference. The converter is provided with means for connecting and disconnecting, respectively, an AC supply source to the one terminal of the coil, ie that terminal on the coil that can also be connected to the DC source. A converter is obtained that has the smallest possible number of components and that is simultaneously capable of performing a gradual switch between supply sources; wherein the one supply source is an AC supply source; and the second supply source is a DC supply source. The converter protects against supply failures during abrupt switches between supply sources.

The converter is characterized in that at least one converter is used to form a DC output that is positive relative to a common point of reference; and at least one converter is used to form a DC output that is negative relative to a common point of reference. A converter is obtained that is able to deliver a positive, optionally more positive, DC output voltages, and one negative, optionally more negative DC output voltages that are protected against supply failures during abrupt switches between supply sources.

The converter is characterized in that the AC supply source is shared for the converters that are used to form a positive output voltage and the converters that are used to form a negative output voltage relative to a common point of reference. A converter is obtained that makes requirements to the smallest possible number of AC supply sources. This is a major advantage in that, thus, the converter can also be used where the availability of AC supply sources is scarce.

The converter is characterized in that the means for connecting and disconnecting, respectively, the one terminal of the coil to/from a DC supply source is a controllable switch. The controllable switch can be regulated to be connected for-at least a part of every other half-period. It is possible to regulate the period of time when supply is obtained from the DC supply source. This is associated with the advantage that it enables parallel coupling of a number of converters to the same battery. Each converter is then allocated a period of time that is different from that of the other converters, during which the converters obtain energy exclusively from the DC supply source. The option of parallel coupling converters to the same DC supply source also means that supply can be obtained by using as few DC sources as possible.

The converter is characterized in that the means for connecting and disconnecting, respectively, the second terminal of the coil to/from a common point of reference is a controllable switch. The controllable switch can be regulated to be connected for at least a part of every other half-period, and the controllable switch is typically connected in burst series. It is possible to regulate the voltage through the coil. On the one hand it makes it possible to perform a gradual switching in consumption of energy from the DC source, and on the other hand it makes it possible to adjust the nominal output voltage on the converter within a field. The option of adjusting the nominal output voltage of the converter within a field means that the same converter design can be used where there is a requirement for several different output voltages. Thereby the number of different converters can be reduced.

The converter is characterized in that semi-conductors are used as controllable switches comprising at least one of the types of field effect transistor, bipolar transistor, insulated Gate Bipolar Transistor (IGBT), Gate Turn-Off Tyristor (GTO) and Injection Enhanced Gate Transistor (IEGT). It is possible to select semi-conductor technology while taking into consideration requirements to supply, construction and space.

The converter is characterized in that—in an overload situation—the current from the AC supply source is limited to a constant largest value, in that supplementary energy is supplied from the DC supply source.

A gentle load of the AC support source is obtained, wherein the converter does not expose the AC supply source to overload.

BRIEF DESCRIPTION OF THE FIGURES

The invention will now be described in further detail with reference to the accompanying figures, wherein.

DETAILED DESCRIPTION

Figure 1:
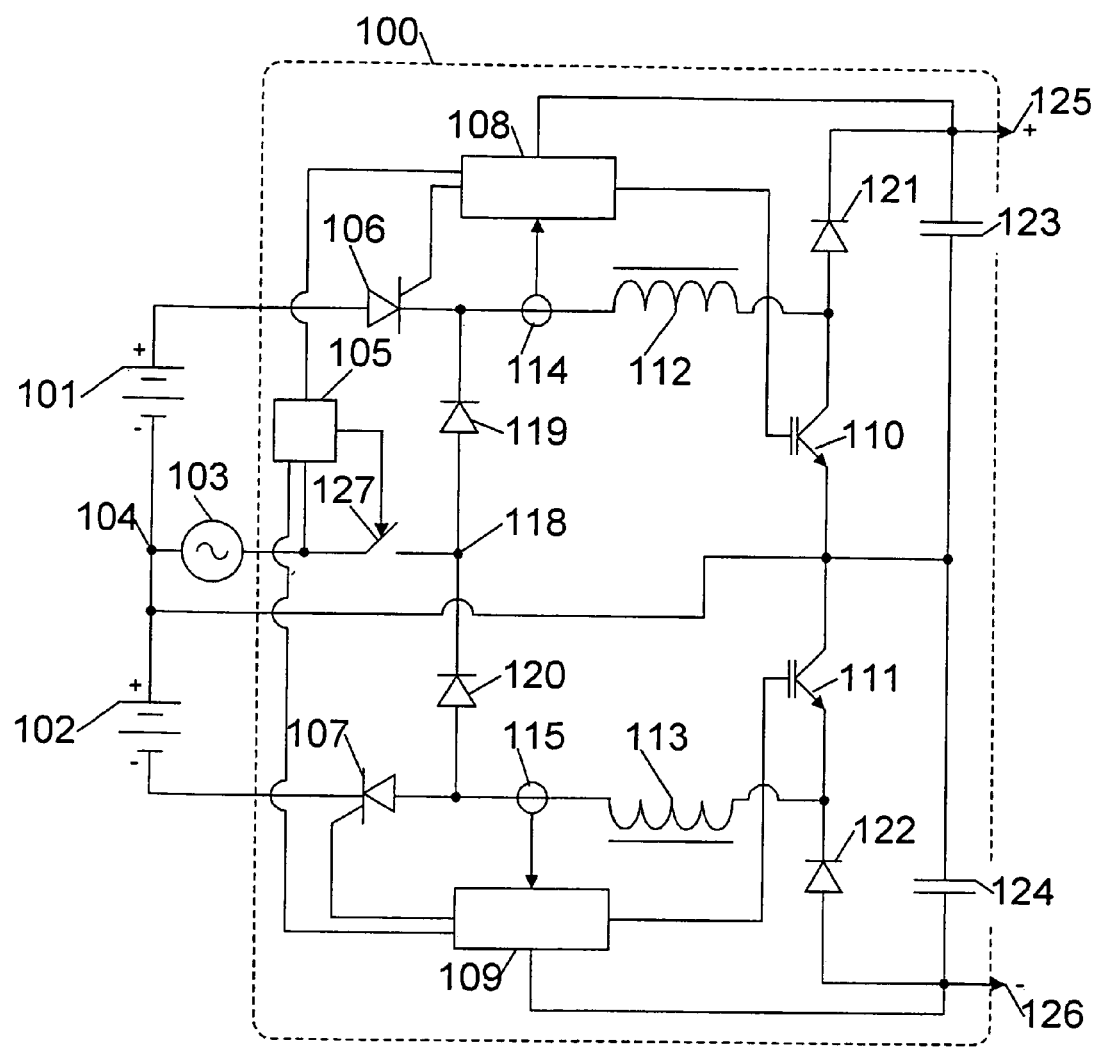
FIG. 1 shows a single-phase combined AC-DC to DC converter with positive as well as negative output voltage.

FIG. 1 shows a single-phase combined AC-DC to DC converter 100 with positive as well as negative output voltage. The positive terminal on a battery 101 is connected to the anode on a tyristor 106. The negative terminal on the battery 101 is connected to a common point of reference 104. The cathode on the tyristor 106 is connected to the cathode on a diode 119. The gate on the tyristor 106 is connected to an output on a control circuit 108. The cathode on the tyristor 106 is connected to a coil 112. A current sensor 114 encloses the connection between the tyristor 106 and the coil 112. The current sensor 114 is connected to an input on the control circuit 108. The coil 112 is further connected to collector on a transistor 110. Collector on the transistor 110 is connected to the anode on a diode 121. Emitter on the transistor 110 is connected to the common point of reference 104. An output on the control circuit 108 is connected to the base of the transistor 110. The cathode on the diode 121 is connected to a capacitor 123 and to a DC output 125. The capacitor 123 is further connected to the common point of reference 104. The DC output 125 is connected to the control circuit 108. The negative terminal on a battery 102 is connected to the cathode on a tyristor 107. The positive terminal on the battery 102 is connected to the common point of reference 104. The anode on the tyristor 107 is connected to the anode on a diode 120. The gate on the tyristor 107 is connected to an output on a control circuit 109. The anode on the tyristor 107 is connected to a coil 113. A current sensor 115 encloses the connection between the tyristor 107 and the coil 113. The current sensor 115 is connected to an input on the control circuit 109. The coil 113 is further connected to emitter on a transistor 111. Emitter on the transistor 111 is connected to the cathode on a diode 122. Collector on the transistor 111 is connected to the common point of reference 104. An output on the control circuit 109 is connected to the base of the transistor 111. The anode on the diode 122 is connected to a capacitor 124 and to a DC output 126. The capacitor is further connected to the common point of reference 104. The DC output 126 is connected to the control circuit 109. The anode on the diode 119 is connected to a node 118. The cathode on the diode 120 is connected to the node 118. The node 118 is connected to a switch 127. The switch 127 is further connected to a single-phase AC source 103 and to the input of a synchronizing circuit 105. The single-phase AC source 103 is further connected to the common point of reference 104. The first output of the synchronizing circuit 105 is connected to an input on the control circuit 108, and the second output of the synchronizing circuit 105 is connected to an input on the control circuit 109, and the third output of the synchronizing circuit 105 is connected to a control input on the switch 127.

It is the task of the synchronizing circuit 105 to register when the AC source 103 is present with a valid voltage with a view to connecting the AC source 102 to the converter 100 via the switch 127. Besides, the synchronizing circuit 105 serves the purpose of synchronizing to the AC supply by generating synchronous control signals to the control circuits 108, 109 with a known phase relative to the AC supply. In the positive half-period of the single-phase AC source 103, the current flows from the single-phase AC-source 103 through the contact 127, further through the diode 119, and further through the coil 112. If the transistor 110 is interrupted, the current flows from the coil 112 further through the diode 121 to the DC output 125, and if the transistor 110 is connected, the current flows from the coil 112 to the common point of reference 104. The tyristor 106 is disconnected for this period. In the negative half-period of the single-phase AC source 103, the control circuit 108 switches on the tyristor 106, whereby the current from the battery 101 flows through the tyristor 106 and further through the coil 112. If the transistor 110 is interrupted, the current flows from the coil 112 to the DC output 125, and if the transistor 110 is connected, the current flows from the coil 112 to the common point of reference 104. The control circuit 108 controls the transistor 110 with pulses of varying duty-cycle, and at a frequency that is usually considerably more elevated than the frequency of the single-phase AC source 103. The auxiliary circuit consisting of the coil 112, the transistor 110 and the diode 121 constitutes a boost converter. During periods when the transistor 110 is connected the current increases in the coil 112. During periods when the transistor is disconnected, the current flows on through the diode 121 to the DC output 125 and will simultaneously start to decrease, the voltage above the coil 112 now having opposite polarity sign. Regulation of the duty-cycle for the transistor 110 enables regulation of the current in the coil 112 and thus also the voltage on the DC output 125. The valid duty cycle for the transistor 110 is determined by the control circuit 108 on the basis of the output voltage that is measured via a return coupling from the DC output 125. The capacitor 123 smoothens the voltage on the DC output 125 to a DC voltage. In the negative half-period of the single-phase AC source 103, the current flows to the single-phase AC-source 103 from the switch 127, further from the diode 120, and further from the coil 113. If the transistor 111 is disconnected, the current flows to the coil 113 further from the diode 122 from the DC output 126, and in case the transistor 111 is connected, the current flows to the coil 113 from the common point of reference 104. The tyristor 107 is, for this period of time, disconnected. In the positive half-period of the single-phase AC source 103, the control circuit 109 switches on the tyristor 107, whereby the current to the battery 102 is caused to flow from the tyristor 107 and on from the coil 113. If the transistor 111 is disconnected, the current flows to the coil 113, from the diode 122, from the DC output, and if the transistor 111 is connected, the current flows to the coil 113 from the common point of reference 104. The control circuit 109 controls the transistor 111 with pulses of varying duty-cycle and at a frequency that is usually considerably more elevated than the frequency of the single-phase AC source 103. The auxiliary circuit consisting of the coil 113, the transistor 111, and the diode 122 constitutes a boost converter. During periods when the transistor 111 is connected, the current increases in the coil 113. In periods when the transistor 111 is disconnected, the current flows on from the diode 122 from the DC output 126 and will simultaneously start to decrease, the voltage above the coil 113 now having opposite polarity sign. Regulation of the duty cycle for the transistor 111 enables regulation of the current in the coil 113 and thus the voltage on the DC output 126, too. The valid duty-cycle for the transistor 111 is determined by the control circuit 109 on the basis of the out-put voltage that is measured via a return coupling from the DC output 126.

The capacitor 124 smooths the voltage on the DC output 126 to a DC voltage. The regulation consists of two independent regulation systems, one for the positive output voltage in the control circuit 108 and another for the negative output voltage in the control circuit 109. Each of these regulation systems has the object of maintaining a constant output voltage and simultaneously absorbing a current with a predetermined well-defined curve shape, whether the current comes from the AC source or the DC source. This is accomplished in practice by using for each of the two control circuits 108 and 109 two regulator loops, one that maintains the curve-shape on the current, and another whose task it is to maintain the constant output voltage. The regulator loop that determines the current curve shape will usually be the fastest of the two regulator loops. It emits on the output a pulse-width modulated signal to one of the two transistors 110 or 111. Each time the transistor 110, 111 is switched on, the current in the coil 112, 113 will increase.

Each time it is switched off, the current will decrease, the voltage above the coil 112, 113 having in that case the opposite polarity sign. In practice this current control can be performed in accordance with various principles that either keep a constant or variable frequency, or control in accordance with the instantaneous or average value of the current, averaged over several pulses. These various principles must be considered to be prior art and all are able to control the current in the coil 112, 113 of a converter 100 to follow optimally the amplitude and the curve-shape on a supplied signal. This is accomplished by comparing the measured value of the current to a signal that corresponds to the desired voltage and continuously adapting the pulse/break-ratio: The current in the coil 112, 113 will all the time either increase or decrease, but is regulated continuously with the pulse/break-ratio, such that—averaged over several pulses—it corresponds to the desired curve-shape. The term 'pulses' as used in this context is intended to designate control pulses for the transistor 110, 111 that will normally be an elevated frequency compared to the current network frequency. This regulator loop receives a signal with a curve-shape and amplitude that corresponds to the current that it is desired that the relevant converter 100 shall draw at a given time. This curve-shape is subsequently referred to as the current reference. The curve-shape of this of the current reference depends on the operating mode of the converter 100. When it is desired to draw current from the AC source 103 only, the curve-shaped will be positive and negative half-periods, respectively, of a sinusoidal signal, such that the total amount of current that is drawn from the net will become sinusoidal. This is the curve-shape that is seen as curve 231 in FIG. 1 during the time 236. When it is desired to draw current from the battery 101, 102 only, the reference to both halves of the converter 100 will exclusively be DC signals, since—in that case—it is desired to draw a constant DC current from the battery 101, 102. When it is desired to draw current from both sources, the current reference will have an appearance that corresponds to the curve 231 in FIG. 2 during the time 235. This curve-shape consists partly of sinusoidal half-waves and partly of rectangular or trapezoidal pulses. The current reference described can either be generated as a voltage or current curve-shape of an electronic circuit, or it can be a digitally computed curve-shape, generated by, e.g., a microprocessor or a Digital Signal Processor (DSP). In order to know in which of the described operation forms, the run is performed, a detector circuit 105 is present that decides whether the AC source 103 is present and has an acceptable voltage quality. When this has been complied with, AC operation is selected. If the AC source 103 disappears or is in any other way detected to be unacceptable as to either voltage or frequency, switching is performed to battery-operation. When the AC voltage is again present and acceptable, a ramp-in course is made, line in FIG. 2. The detector circuit 105 can be shared by both converters. In order to generate the desired curve shapes, a synchronization unit 105 is also used. It also receives the AC signal and synchronizes to this AC signal. It is thereby able to emit phase information to the two control/regulator units 109 and 109 that tells where in time one is relative to the zero transit on the AC signal, e.g., as a degree figure between zero and 360 degrees. Such phase information is subsequently used to determine the course in time of the described curve-shapes. In addition to said signals concerning operating mode and synchronization, it must also be possible to continuously adapt the amplitude on the described current references. By changing the amplitude on the signals, the amount of current to be drawn from the AC source 103 or the DC source 101, 102 is changed, and thus how much power is supplied to the converter 100. This power supply must continuously be adapted to exactly cover the need for power that is drawn from the converter 100 output(s) plus what can be ascribed to loss. In case more power is supplied than needed, it would mean that the voltage on the capacitors 123 or 124 will continue to increase, and correspondingly the voltages will decrease if too little power is supplied. In order to thereby maintain the correct output voltage there is therefore in each of the control/regulator circuits 108 and 109 a regulator loop that measures the voltages on 125 and 126 and compares them to suitable reference values. In case the output voltage deviates from the desired, the amplitudes on the described current reference signals are regulated upwards or downwards. Only one specific maximum value for the current drawn from the AC source 103 is allowed at all times. During a ramp-in course, this maximum value is increased linearly from zero to a predetermined maximum value within a predetermined period, e.g., 10 seconds. If it is desired to supply more current or power than allowed by this maximum value, there is formed, on the one hand, half-wave shaped sinusoidal signals with the maximally allowed value, whereas the remainder of the power need is covered by current pulses from the battery. The distribution between the two pulses is calculated continuously, such that they combine to cover the need for supplied power. Correspondingly, this limitation of AC current pulses is used to delimit the current from a current network or diesel generator during overload. Also in this case it is calculated how much supplement is needed from the battery to deliver the requisite total amount of power. if the node 118 is split and if the AC source 103 and the switch 127 are connected instead to the alternating current inputs of a rectifier bridge, where the positive output of the rectifier bridge is connected to the anode on the diode 119, and the negative output of the rectifier bridge is connected to the cathode on the diode 120, it is also possible to obtain supply from the AC source 103 in both half-periods to both the positive half and the negative half of the converter 100. Hereby the power consumption from the batteries 101; 102 can be reduced.

Figure 2:
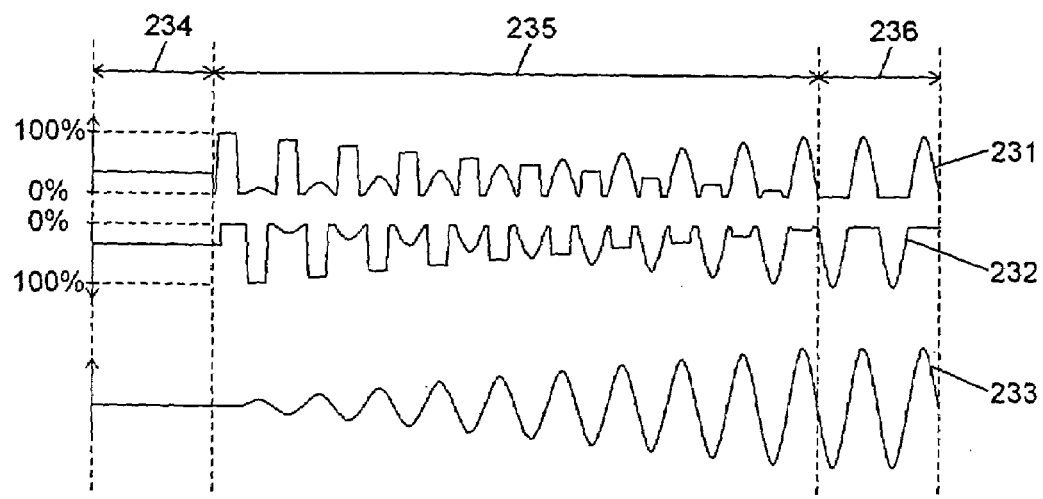
FIG. 2 shows curves of a ramp-in course for a single-phase combined AC-DC to DC converter with positive as well as negative output voltage.

FIG. 2 shows curves of a ramp-in course for a single-phase combined AC-DC to DC converter 100 with positive as well as negative output voltage. A first curve 231 shows the current through the coil 112. A second curve 232 shows the current through the coil 113. A third curve 233 shows the total current of the single-phase AC source 103. To the first curve 231, and the second curve 232 and the third curve 233 it applies that a first period of time 234 shows supply exclusively from the batteries 101, 102 and a second period of time 235 shows a ramp-in course with supply from the batteries 101, 102 and the single-phase AC source 103, where the current from the batteries 101, 102 is reduced in pace with the current from the single-phase AC current 103 being increased, and further a third period of time 236 that shows supply exclusively from the single-phase AC source 103.

During the period of time 234, the batteries 101, 102 supply alone the combined AC-DC to DC converter 100. During the period 235 a ramp-in course takes place, where supply is accomplished from the batteries 101, 102 as well as from the single-phase AC source 103. The strength of the pulse current from the batteries 101, 102 is reduced in pace with the pulse current from the single-phase AC source 103 being increased. During the period of time 236 the single-phase AC source 103 delivers exclusively to the combined AC-DC to DC converter 100.

Figure 3:
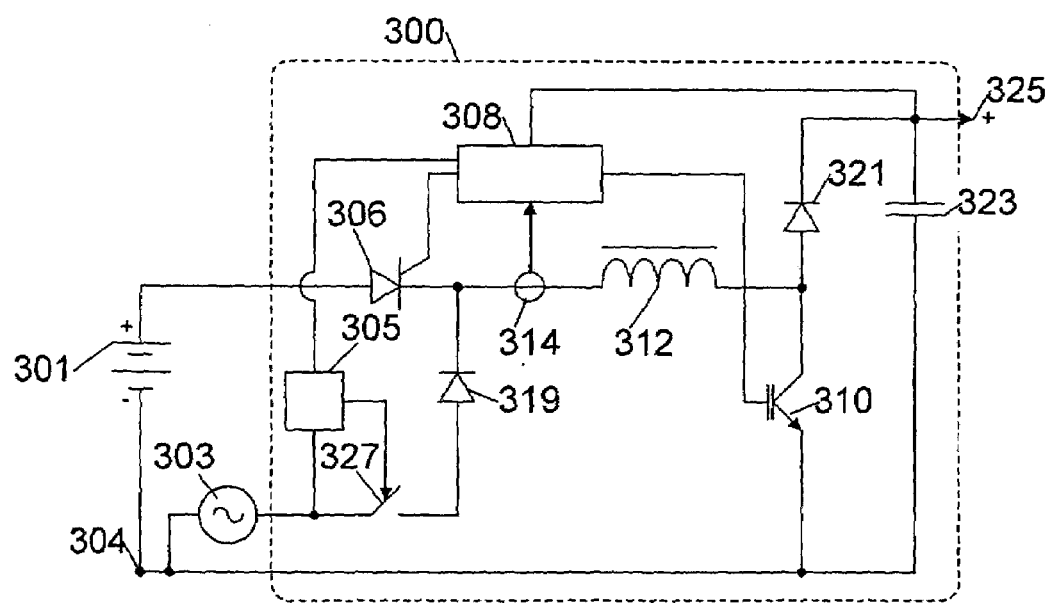
FIG. 3 shows a single-phase combined AC-DC to DC converter with positive output voltage.

FIG. 3 shows a single-phase combined AC-DC to DC converter 300 with positive output voltage. The positive terminal on a battery 301 is connected to the anode on a tyristor 306. The negative terminal on the battery 301 is connected to the anode on a tyristor 306. The negative terminal on the battery 301 is connected to a common point of reference 304. The cathode on the tyristor 306 is connected to the cathode on a diode 319. The gate on the tyristor 306 is connected to an output on a control circuit 308. The cathode on the tyristor 306 is connected to a coil 312. A current sensor 314 encloses the connection between the tyristor 306 and the coil 312. The current sensor 314 is connected to an input on the control circuit 308. The coil 312 is further connected to a collector on a transistor 310. Collector on the transistor 310 is connected to the anode on a diode 321. Emitter on the transistor 310 is connected to the common point of reference 304. An output on the control circuit 308 is connected to the base of the transistor 310. The cathode on the diode 321 is connected to a capacitor 323 and to a DC output 325. The capacitor 323 is further connected to the common reference point 304. The DC output 325 is connected to the control circuit 308. The anode on the diode 319 is further connected to switch 327. The switch 327 is further connected to a single-phase AC source 303 and to the input of a synchronization circuit 305. The single-phase AC source 303 is further connected to the common reference point 304. The one output of the synchronization circuit 305 is connected to an input on the control circuit 308, and the second output of the synchronization circuit 305 is connected to a control input on the switch 327.

The indication of functionality for a single-phase combined AC-DC to DC converter 300 with positive output voltage, in accordance with FIG. 3, follows the indication of functionality for the positive half of a single-phase combined AC-DC to DC converter 100 with positive as well as negative output voltage, in accordance with FIG. 1. Like the single-phase combined AC-DC to DC converter 100 with positive as well as negative output voltage, the AC source 303 and the switch 327 can instead be coupled to the alternating-current inputs of a rectifier bridge, where the positive output of the rectifier bridge is connected to the anode on the diode 319, and the negative output of the rectifier bridge is connected to the reference point 304. Hereby it is possible to obtain supply from the AC source 303 in both half-periods to the converter 300. Hereby the power consumption from the battery 301 can be reduced.

Figure 4:
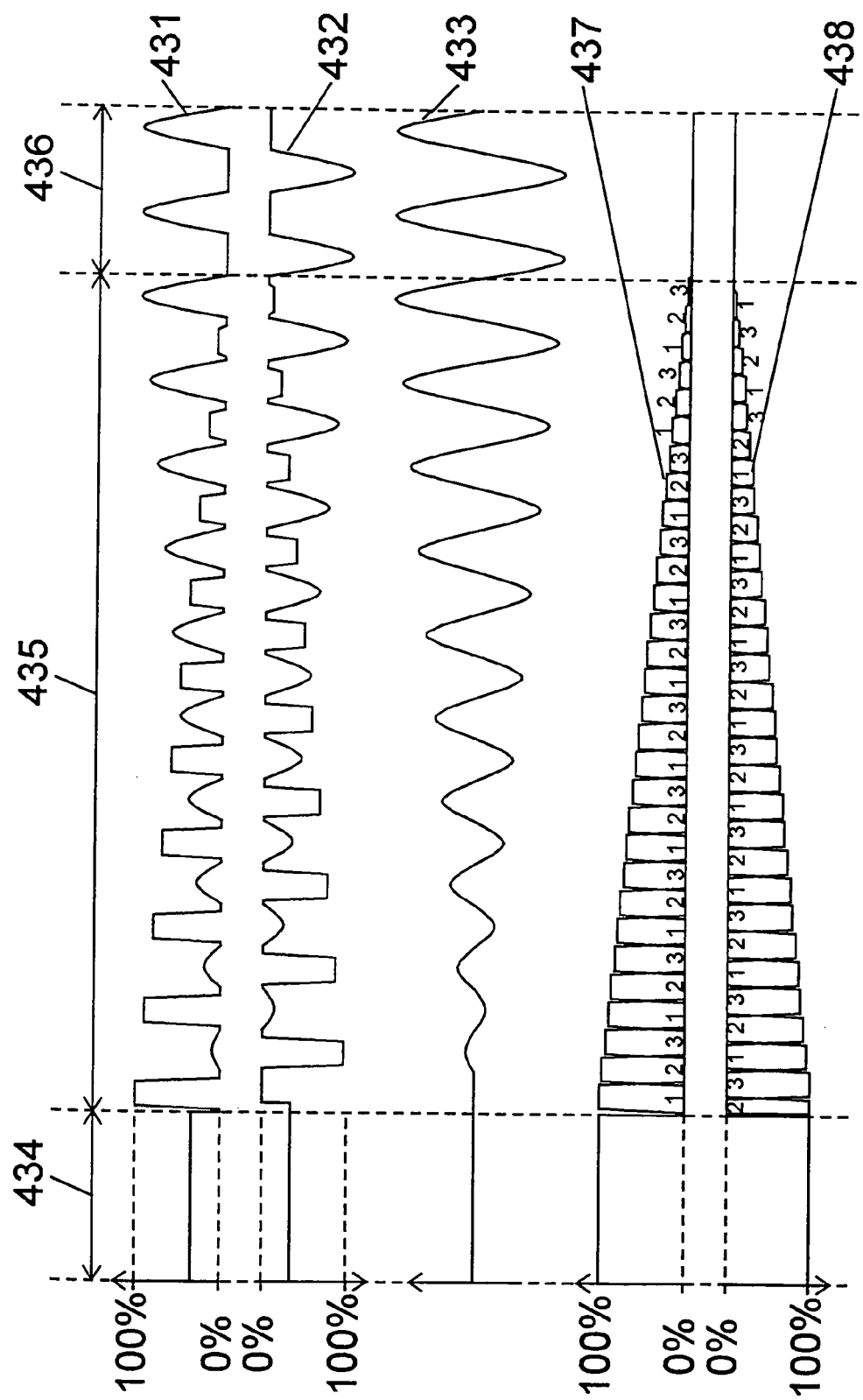
FIG. 4 shows curves of a ramp-in course for a three-phase combined AC-DC to DC converter with positive as well as negative output voltage.

FIG. 4 shows curves of a ramp-in course for a three-phase combined AC-DC to DC converter 700, 740, 780 with positive as well as negative output voltage. A first curve 431 shows the current through the coil in the positive half of the converter for a phase (phase 1). A second curve 432 shows the current through the coil in the negative half of the converter for the same phase (phase 1). A third curve 433 shows the total amount of current of the AC source 703 for the same phase (phase 1). A fourth curve 437 shows the total amount of current from the battery 701 to the positive half of the converter for all three phases (phase 1, phase 2 and phase 3). A fifth curve 438 shows the total amount of current to the battery 702 from the negative half of the converter for all three phases (phase 1, phase 2 and phase 3). To the first curve 431, and the second curve 432, and the third curve 433, and the fourth curve 437, as well as the fifth curve 438 it applies that a first period of time 434 shows supply exclusively from the batteries 701, 102, and a second period of time 435 shows a ramp-in course with supply from the batteries 701, 702 and the AC source 703, where the current from the batteries 701, 702 is reduced in pace with the current from the AC source 703 being increased, and also a third period of time 436 that shows supply exclusively from the AC source 703.

The indication of functionality for the ramp-in course for a three-phase combined AC-DC to DC converter 700, 740, 780 with positive as well as negative output voltage, in accordance with FIG. 4, follows the indication of functionality for the ramp-in course for a single-phase combined AC-DC to DC converter 100 with positive as well as negative output voltage, in accordance with FIG. 2. It is noted that the batteries 701, 702 are shared (and identical) for converters 700, 740, 780 for all three phases (phase 1, phase 2 and phase 3). Batteries 701, 702 deliver to three otherwise independent circuits 700, 740, 780 that each corresponds to a single-phase combined AC-DC to DC converter 100 with positive as well as negative output voltage, in accordance with FIG. 1. This means that the battery 701 is connected to three tyristors in each their circuit 700, 740, 780, and the battery 702 is connected to three tyristors in each of the same three circuits. The three circuits 700, 740, 780 use each their phase, where the common point of reference 704 is shared for the three phases.

Figure 5:
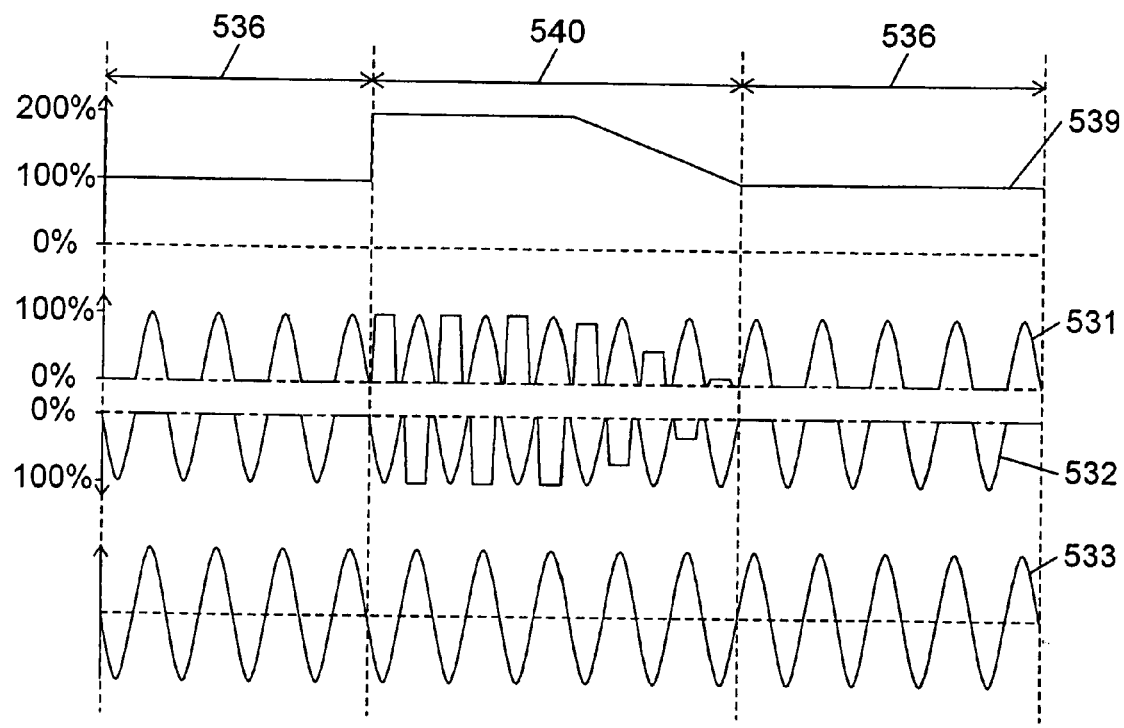
FIG. 5 shows curves of an overload course for a single-phase combined AC-DC to DC converter with positive as well as negative output voltage.

FIG. 5 shows curves of an overload course for a single-phase combined AC-DC to DC converter 100 with positive as well as negative output voltage. A first curve 539 shows the current load in percentages relative to an allowable upper current threshold. A second curve 531 shows the current through the coil 112. A third curve 532 shows the current through the coil 113. A fourth curve 533 shows the total amount of current of the single-phase AC source 103. To the first curve 539, and the second curve 531, and the third curve 532, and the fourth curve 533 it applies that a first and third period of time 536 show normal operation with supply exclusively from the single-phase AC source 103, and a second period of time 540 shows an overload course with supply from both the batteries 101, 102 and the single-phase AC source 103, where the current from the batteries 101, 102 are of such magnitude that the current from the single-phase AC source 103 is kept constant and also within certain allowable current thresholds.

During the two periods 536 normal operations take place, where the single-phase AC source 103 alone delivers to the combined AC-DC to DC converter 100. During the period of time 540 an overload course occurs, where supply takes place from both the batteries 101, 102 and the single-phase AC source 103. The pulse current from the batteries 101, 102 is adjusted to such magnitude that compensation is fully made for the overload, whereby the current from the single-phase AC source 103 is kept constant and within certain allowable thresholds.

Figure 6:
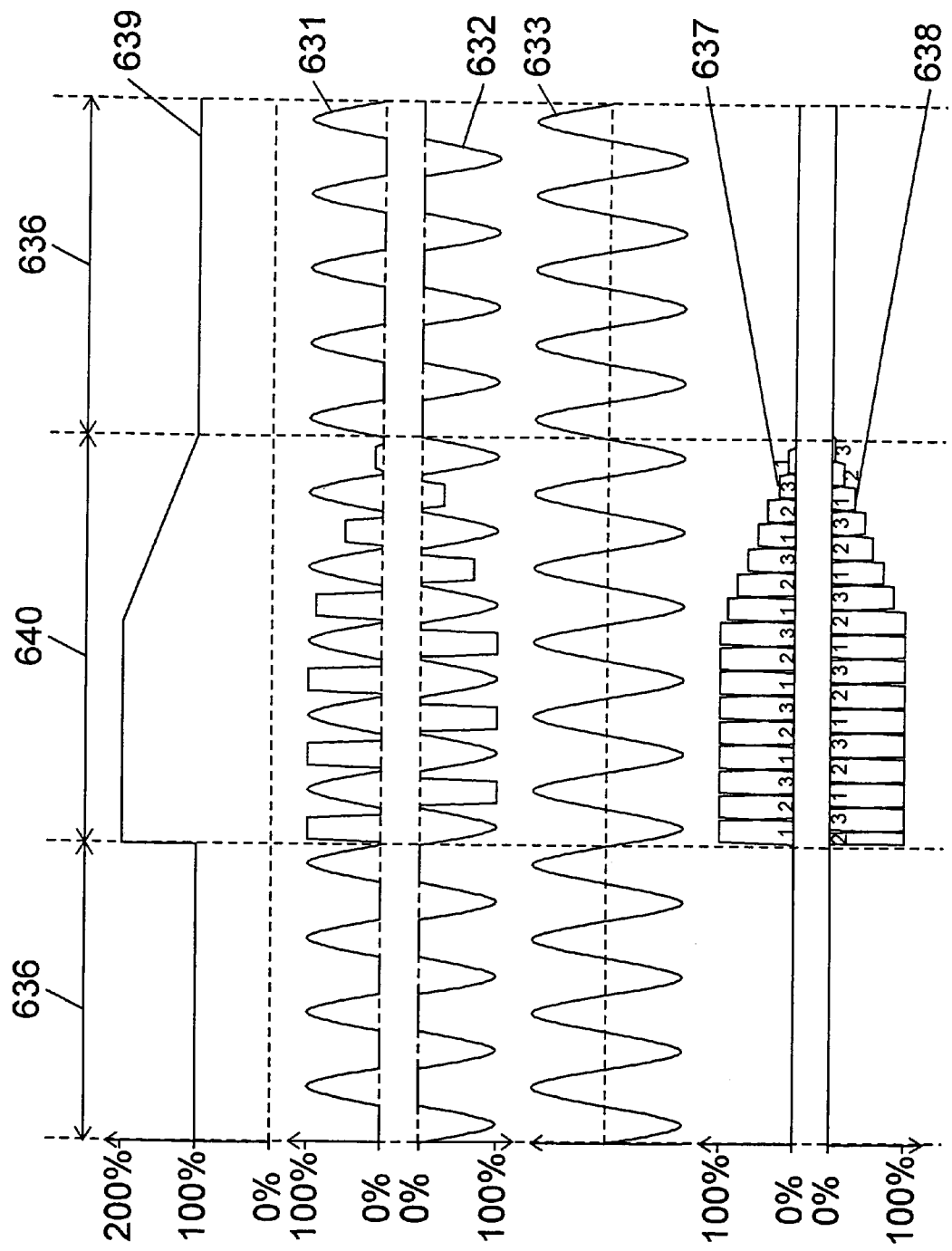
FIG. 6 shows curves of an overload course for a three-phase combined AC-DC to DC converter with positive as well as negative output voltage.

FIG. 6 shows curves of an overload course for a three-phase combined AC-DC to DC converter 700, 740, 780 with positive as well as negative output voltage. A first curve 639 shows the current load as percentages on all three phases relative to an allowable upper current threshold. A second curve 631 shows the current through the coil in the positive half of the converter for a phase (phase 1). A third curve 632 shows the current through the coil in the negative half of the converter for same phase (phase 1). A fourth curve 633 shows the total amount of current of the AC source 703 for the same phase (phase 1). A fifth curve 637 shows the total amount of current from the battery 701 to the positive half of the converter to all three phases (phase 1, phase 2 and phase 3). A sixth curve 638 shows the total amount of current to the battery 702 from the negative half of the converter from all three phases (phase 1, phase 2 and phase 3). To the first curve 639, and the second curve 631, and the third curve 632, and the fourth curve 633 it applies that a first and third period of time 636 show normal operation with supply exclusively from the AC source 703, and a second period of time 640 that shows an overload course with supply from both the batteries 701, 702 and the AC source 703, where the current from the batteries 701, 702 is of such magnitude that the current from the AC source 703 is kept constant and further within given allowable current thresholds.

The indication of functionality for the overload course for a three-phase combined AC-DC to DC converter 700, 740, 780 with positive as well as negative output power, in accordance with FIG. 6, follows the indication of functionality for the overload course for a single-phase combined AC-DC to DC converter 100 with positive as well as negative output load, in accordance with FIG. 5. It is noted that the batteries 701, 702 are shared (and identical) for converters 700, 740, 780 for all three phases (phase 1, phase 2 and phase 3). Batteries 701, 702 deliver to three otherwise independent circuits 700, 740, 780, that each corresponds to a single-phase combined AC-DC to DC converter 100 with positive as well as negative output voltage, in accordance with FIG. 1. This means that the battery 701 is connected to three tyristors in each their circuit 700, 740, 780 and the battery 702 is connected to three tyristors in each of the same three circuits. The three circuits 700, 740, 7809 use each their phase, wherein the common point of reference 704 is shared for the three phases.

Figure 7:
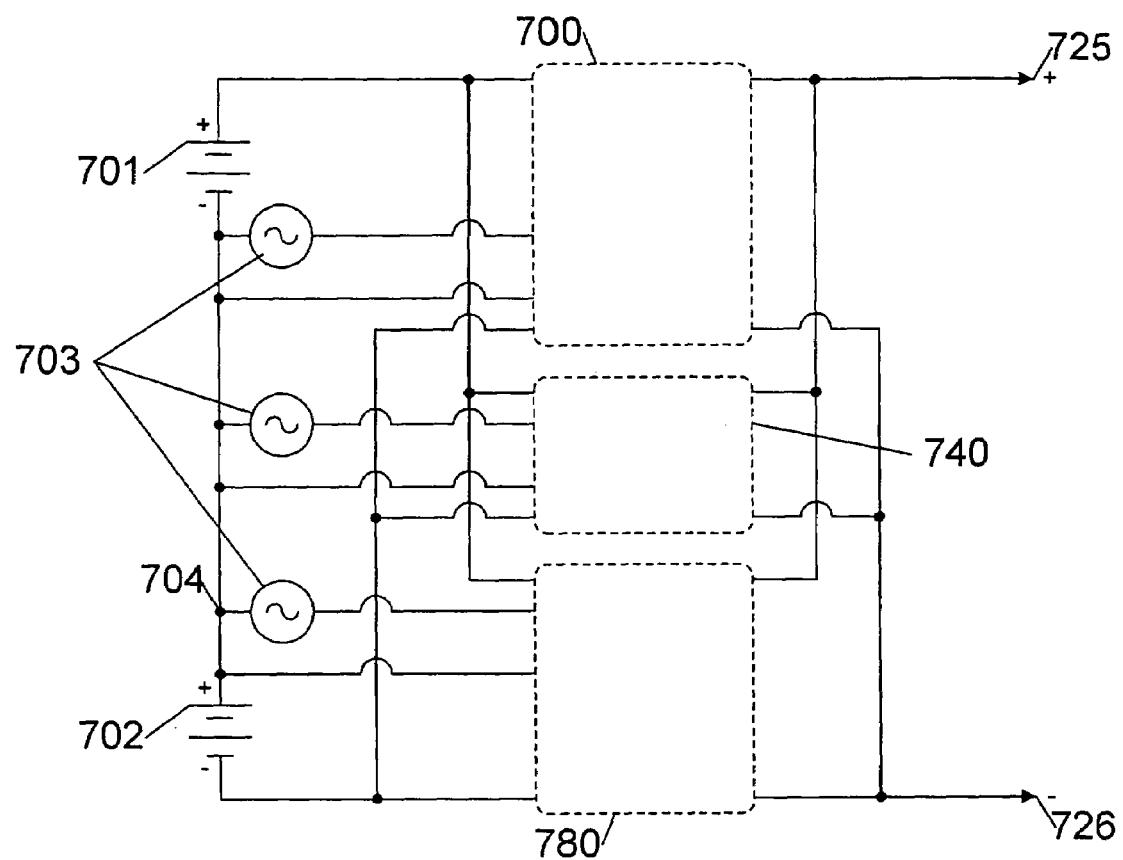
FIG. 7 shows a three-phase combined AC-DC to DC converter with positive as well as negative output voltage constructed from three converters with shared DC supply.

FIG. 7 shows a three-phase combined AC-DC to DC converter with positive as well as negative output voltage constructed by means of three converters 700, 740, 80 with shared DC supply 701, 702. The positive terminal on a battery 701 is connected to the anode on a tyristor in each of the three converters 700, 740, 780 corresponding to the tyristor 106 in FIG. 1. The negative terminal on the battery 701 is connected to a common point of reference 704. The negative terminal on a battery 702 is connected to the cathode on a tyristor in each of the three converters 700, 740, 780, corresponding to the tyristor 107 in FIG. 1. The positive terminal on the battery 702 is connected to the common point of reference 704. A switch in each of the three converters 700, 740, 780, corresponding to the switch 127 in FIG. 1, is connected to each their phase on an AC source 703. The AC source 703 is further connected to a common point of reference 704. The positive outputs of the three converters 700, 740, 780 are all connected to an output 725. The negative outputs of the three converters 700, 740, 780 are all connected to an output 726. The references of the three converters 700, 740, 780 are all connected to the point of reference 704.

The indication of functionality for a three-phase combined AC-DC to DC converter with positive as well as negative output voltage constructed from three converters 700, 740, 780 with shared DC supply 701, 702, in accordance with FIG. 7, follows the indication of functionality for a single-phase combined AC-DC to DC converter 100 with positive as well as negative output voltage, in accordance with FIG. 1.

Figure 8:
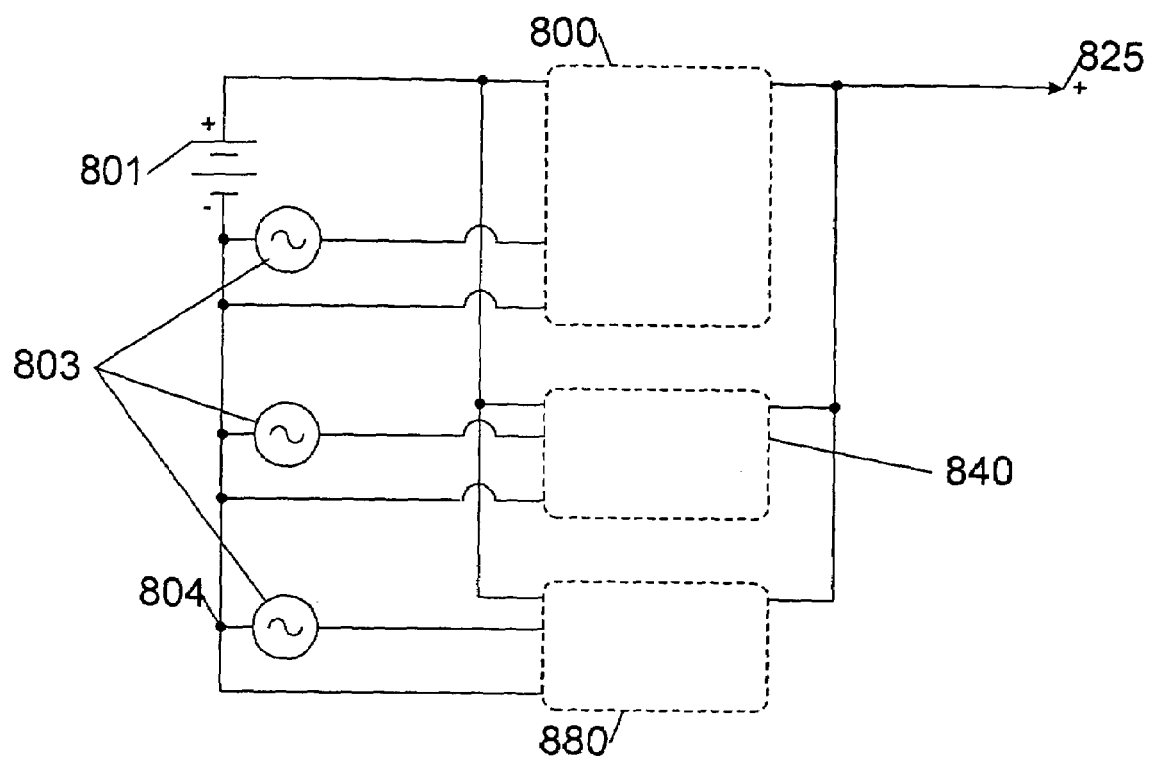
FIG. 8 shows a three-phase combined AC-DC to Dc converter with positive output voltage constructed from three converters with shared DC supply.

FIG. 8 shows a three-phase combined AC-DC to DC converter with positive output voltage constructed from three converters 800, 840, 880 with shared DC supply 801. The positive terminal on a battery 801 is connected to the anode on a tyristor in each of the three converters 800, 840, 880, corresponding to the tyristor 306 in FIG. 3. The negative terminal on the battery 801 is connected to a common point of reference 804. A switch in each of the tree converters 800, 840, 880, corresponding to the switch 327 in FIG. 3, is connected to each their phase on an AC source 803. The AC source 803 is further connected to a common point of reference 804. The negative outputs of the three converters 800, 840, 880 are all connected to an output 825. The references of the three converters 800, 840, 880 are all connected to the point of reference 804.

The indication of functionality for a three-phase combined AC-DC to DC converter with positive as well as negative output voltage constructed from three converters 800, 840, 880 with common DC supply 801, in accordance with FIG. 8, follows the indication of functionality for the positive half of a single-phase combined AC-DC to DC converter 100 with positive as well as negative output voltage, in accordance with FIG. 1.

The converter (100, 300, 700, 740, 780, 800, 840, 880) can be characterized, e.g., in that—at a given load, typically full load—on at least one DC output (125, 126, 325, 725, 726, 825) switches occur adaptively from a DC supply source (101, 102, 301, 701, 702, 801) to an AC supply source (103, 303, 703, 803), typically a diesel generator, while taking into consideration stability of frequency and voltage on the AC supply source (103, 303, 703, 803). By such adaptive switch of source, gradual switching from the DC supply source to the AC supply source will occur, where supply from both supply sources takes place during the switching time. The adaptive switch of source optionally comprises that there are several, consecutive periods with supply from both supply sources. Finally, the adaptive switching of source means that it is possible to switch completely or partially back to the DC supply source. Hereby a gentler coupling onto the AC supply source is obtained, where the converter does not expose the AC supply source to abrupt and forceful loading couplings. Hereby the AC source is protected against overload with ensuing fluctuation of, e.g., frequency and voltage. If the AC source is, e.g., a diesel generator, it is important to avoid abrupt and forceful loading couplings, since they translate onto the rotor current, whereby the diesel generator becomes instable with regard to both frequency and voltage. In a worst-case scenario, the instability may result in self-oscillation with ensuing supply failures.

The converter (100, 300, 700, 740, 780, 800, 840, 880) can be, e.g., characterized in that—upon supply from an AC supply source (103, 303, 703, 803), typically a diesel generator, dynamic load changes are compensated, where the current from at least one DC output (125, 126, 325, 725, 726, 825) is increased adaptively. The adaptive compensation of dynamic load changes occurs with due regard to stability of frequency and voltage on the AC supply source (103, 303, 703, 803) by obtaining supplementary energy from a DC supply source (101, 102; 301, 701, 702, 801). By such adaptive compensation of dynamic load changes, a supplementary supply from the DC supply source will occur, in that supply will—for a period of time—take place from both supply sources. Optionally there may be several consecutive periods with supply from both supply sources. Hereby a gentler load onto the AC supply source is obtained, where the converter does not expose the AC supply source to abrupt and forceful loading couplings. Hereby the AC source is protected against overload with ensuing fluctuation of, e.g., frequency and voltage. If the AC source is, e.g., a diesel generator, it is important to avoid abrupt and forceful loading couplings, since they translate onto the rotor current. Hereby the diesel generator becomes instable with regard to both frequency and voltage, and in a worst-case scenario, the instability may result in self-oscillation with ensuing supply failures.

The invention claimed is:

1. A converter for providing at least one DC output from at least one AC supply with at least one phase and at least one DC supply, the at least one AC supply supplying an AC signal comprising positive and negative half-periods, the converter comprises at least one coil that is in connection with the at least one DC output, the converter contains controllable contact means for connecting and disconnecting the at least one AC supply and the at least one DC supply to/from said converter wherein connecting and disconnecting of the AC and DC supplies to/from said converter is based on phase information of the AC signal, whereby the AC signal fed to the coil is divided into periods, wherein the periods of the AC signal alternatingly originate from either positive or negative half-periods of the AC signal and current pulses from the at least one DC supply; and wherein the current pulses from the at least one DC supply are regulated in dependence of the AC signal; and wherein the converter contains means for voltage regulating the at least one DC output.

2. A converter according to claim 1, wherein the at least one AC supply source is a single-phase AC source.

3. A converter according to claim 1, wherein the at least one AC supply source is a poly-phase AC source.

4. A converter according to claim 1, wherein—on the basis of a signal from a current detector that measures the current through a first coil of the at least one coil, a control circuit has means for selectively connecting a second terminal of the first coil to a first DC supply of the at least one DC supply, and to a common point of reference; and that the current through the first coil flows to a first DC output of the at least one DC output of the converter during periods of time, where the second terminal of the first coil is not connected to the common point of reference; and that the converter has means for connecting and disconnecting, respectively, a first AC supply of the at least one AC supply source to/from the second terminal of the first coil.

5. A converter according to claim 1, wherein at least one converter is used to form a positive DC output relative to a common point of reference; and at least one converter is used to form a negative DC output relative to a common point of reference.

6. A converter according to claim 5, wherein the at least one AC supply source is shared by the at least one converters that is/are used to form the positive DC output voltage and the at least one converters that is/are used to form the negative DC output voltage, respectively, relative to a common point of reference.

7. A converter according to claim 4, wherein the means for selectively connecting includes a controllable switch; and that the controllable switch can be regulated to be connected for at least a part of every other half-period.

8. A converter according to claim 4, wherein the means for selectively connecting includes a controllable switch; and that the controllable switch can be regulated to be connected for at least a part of every other half-period; and that the controllable switch is typically connected in burst series.

9. A converter according to claim 4, wherein the means for selectively connecting includes semiconductors used as controllable switches comprising at least one of a field power transistor, bipolar transistor, Insulated Gate Bipolar Transistor (IGBT), Gate Turn-Off Tyristor (GTO) and Injection Enhanced Gate Transistor (IEGT).

10. A converter according to claim 1, wherein, in an overload situation, the current from the at least one AC supply source is limited to a constant maximum value, in that supplemental energy is supplied by the at least one DC supply source.

* * * * *